(12) United States Patent
Ito

(10) Patent No.: US 11,788,597 B2
(45) Date of Patent: Oct. 17, 2023

(54) GAS CUSHION DEVICE

(71) Applicant: AIDA ENGINEERING, LTD., Kanagawa (JP)

(72) Inventor: Takao Ito, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 1232 days.

(21) Appl. No.: 16/361,568

(22) Filed: Mar. 22, 2019

(65) Prior Publication Data

US 2019/0301557 A1 Oct. 3, 2019

(30) Foreign Application Priority Data

Mar. 27, 2018 (JP) .................................. 2018-060614
Feb. 7, 2019 (JP) .................................. 2019-020917

(51) Int. Cl.
*F16F 9/02* (2006.01)
*F16F 9/512* (2006.01)
*F16F 9/32* (2006.01)
*F16F 7/09* (2006.01)

(52) U.S. Cl.
CPC ............... *F16F 9/02* (2013.01); *F16F 7/09* (2013.01); *F16F 9/0209* (2013.01); *F16F 9/3214* (2013.01); *F16F 9/3235* (2013.01); *F16F 9/3278* (2013.01); *F16F 9/5126* (2013.01)

(58) Field of Classification Search
CPC .................................. F16F 9/02; F16F 9/3235
See application file for complete search history.

(56) References Cited

U.S. PATENT DOCUMENTS

| 1,952,902 A | * | 3/1934 | Barros | ..................... F16F 9/06 |
| | | | | 188/269 |
| 3,155,120 A | * | 11/1964 | Focht | ..................... D03D 49/36 |
| | | | | 188/289 |
| 4,529,181 A | | 7/1985 | Wallis | |
| 4,628,579 A | * | 12/1986 | Taylor | ..................... F16J 15/48 |
| | | | | 29/422 |
| 4,804,290 A | * | 2/1989 | Balsells | ................ F04B 53/143 |
| | | | | 403/368 |

(Continued)

FOREIGN PATENT DOCUMENTS

CN 204805416 U 11/2015
CN 106460987 A 2/2017

(Continued)

OTHER PUBLICATIONS

Notice of Reasons for Refusal issued in corresponding JP Application No. 2019-020917, dated Jan. 11, 2022 w/ Machine English Translation.

(Continued)

*Primary Examiner* — Melody M Burch
(74) *Attorney, Agent, or Firm* — McDermott Will & Emery LLP

(57) ABSTRACT

A gas cushion device includes a cylinder, a piston slidably fitted in the cylinder, a gas enclosed in the cylinder to energize the piston, and an oil feeding mechanism configured to feed a lubricating oil to a fitting portion between the cylinder and the piston. The cylinder and the piston are fitted in an interference fit state. The piston is reduced in diameter from an inside of the cylinder toward the outside of the cylinder.

10 Claims, 14 Drawing Sheets

(56) References Cited

U.S. PATENT DOCUMENTS

| | | | | |
|---|---|---|---|---|
| 4,913,268 | A | * | 4/1990 | Parker .................. F16F 9/3235 |
| | | | | 293/134 |
| 9,511,466 | B2 | * | 12/2016 | Kawakami .......... F15B 15/2815 |
| 9,587,455 | B2 | * | 3/2017 | Frey .......................... F15B 1/24 |
| 2009/0159828 | A1 | * | 6/2009 | Esser .................. B29C 45/281 |
| | | | | 251/324 |
| 2010/0038179 | A1 | * | 2/2010 | Kimura ................ F16F 9/0218 |
| | | | | 184/24 |
| 2014/0230645 | A1 | | 8/2014 | Bauer et al. |
| 2017/0198780 | A1 | | 7/2017 | Nakasone |
| 2018/0003257 | A1 | * | 1/2018 | Knol .................... E02F 9/2271 |

FOREIGN PATENT DOCUMENTS

| | | | |
|---|---|---|---|
| DE | 4430502 A1 | * 2/1996 | .......... F15B 15/1428 |
| EP | 1653116 A2 | 5/2006 | |
| JP | S60-216933 A | 10/1985 | |
| JP | 05-69200 A | 3/1993 | |
| JP | 2005-291470 A | 10/2005 | |
| JP | 2006-528072 A | 12/2006 | |
| WO | 2005/007313 A1 | 1/2005 | |

OTHER PUBLICATIONS

The First Office Action issued in corresponding CN Application No. 201910226697.7, dated Dec. 21, 2021 w/ Machine English Translation.

The Extended European Search Report dated Aug. 9, 2019 for the related European Patent Application No. 19163438.5.

Second Office Action issued in the corresponding Chinese Application No. 201910226697.7 dated May 20, 2022, with English translation (10 pages).

Jinping, D. et al., "General Machinery", Beijing Institute of Technology Press, Technology Press, Nov. 2011, with English Translation (14 pages).

* cited by examiner

Fig. 10A
Fig. 10B
Fig. 10C
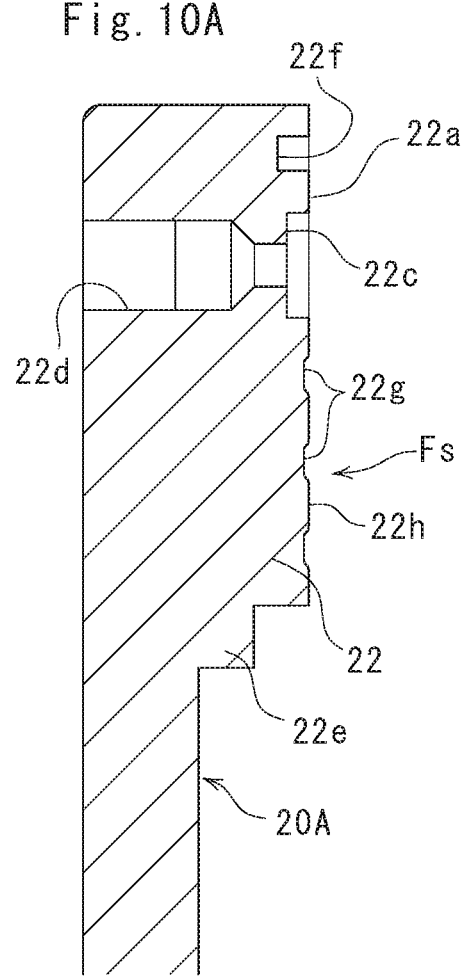
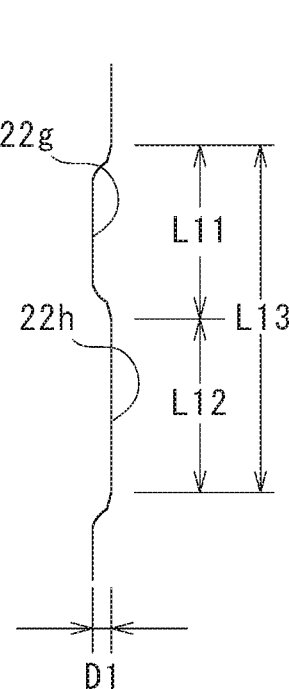
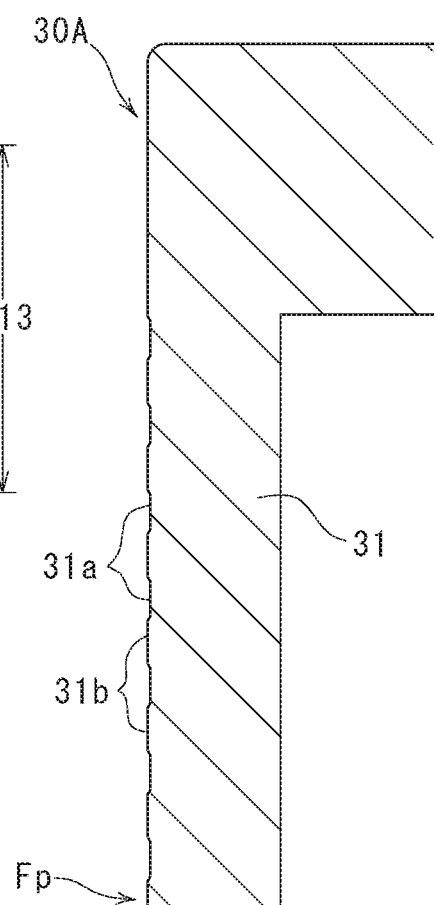
Fig. 10D
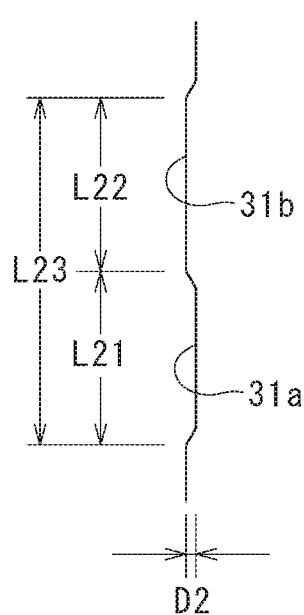

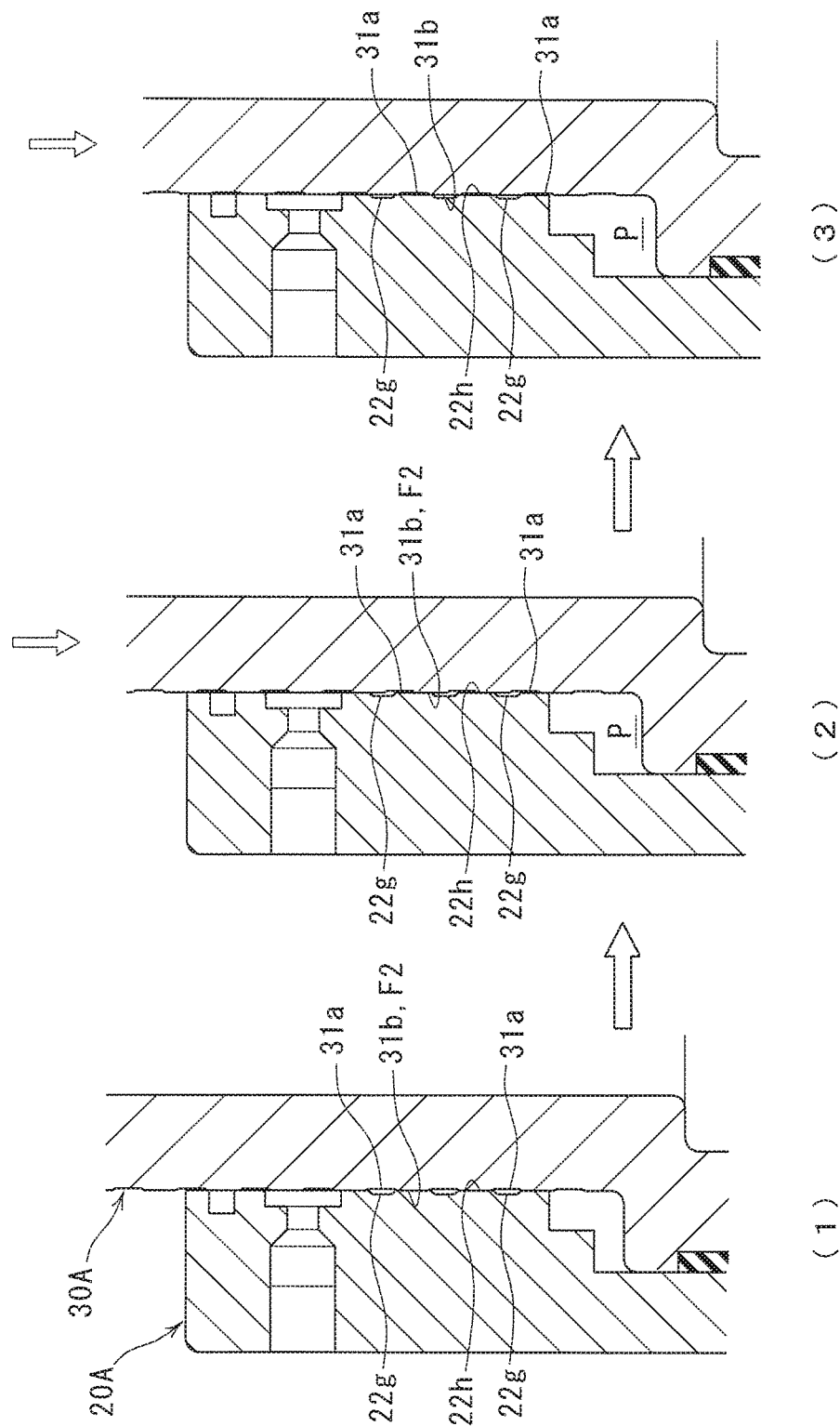

GAS CUSHION DEVICE

TECHNICAL FIELD

The present invention relates to a gas cushion device.

BACKGROUND ART

As a substitute for a spring used for many industrial machines, a gas filled type gas cushion is known. The gas cushion has a feature that it is high in load (high in cushion force) compared with a coil spring and the like and space saving can be easily achieved.

In Patent Documents 1 to 3, it is disclosed that this gas cushion is used as a die cushion of a press machine.

PRIOR ART

Patent Document

Patent Document 1: Japanese Unexamined Patent Application Publication No. H5-69200
Patent Document 2: Japanese Unexamined Patent Application Publication No. 2005-291470
Patent Document 3: Japanese Unexamined Patent Application Publication No. 2006-528072

SUMMARY OF THE INVENTION

Problems to be Solved by the Invention

However, a higher cushion force is required for a die cushion used for press processing and plate forging of a high tensile strength material in recent years. As a result, in some cases, a gas cushion lacks capacity. In order to obtain a desired cushion force, it is also considered to arrange a number of gas cushions, which may sometimes lead to reduction in rigidity of the die.

Under the circumstances, the present invention aims to provide a gas cushion device capable of obtaining a high cushion force.

Means for Solving the Problems

The gas cushion device of the present invention is provided with a cylinder 20, a piston 30 slidably fitted in the cylinder 20, a gas G enclosed in the cylinder 20 to energize the piston 30, and an oil feeding mechanism 11 for feeding a lubricating oil L to a fitting portion F1 between the cylinder 20 and the piston 30. The cylinder 20 and the piston 30 are fitted in an interference fit state.

Note that the "interference fit" denotes the "interference fit: a fit in which interference always exists when a hole and a shaft are assembled" described in "Dimensional Tolerances and Methods of Fitting Part 1: Bases of Tolerances, Deviations and Fits" of JIS B0401-1 (1988).

Further, it is preferable that the piston 30 be reduced in diameter from an inside of the cylinder 20 toward the outside of the cylinder 20.

Further, it is preferable that a frictional force due to the interference fit is smaller than a repulsive force by the gas G.

Further, it is preferable that a space P be formed between the cylinder 20 and the piston 30 so that a volume of the space P is increased when the piston 30 is depressed and the volume of the space P is decreased when the piston 30 is pulled out, and the space P constitutes a pump of the oil feeding mechanism 11.

It is also preferable that the cylinder 20A be provided with a plurality of first recesses 22g arranged in the piston sliding direction at the fitting portion F1, the piston 30A be provided with a plurality of second recesses 31a arranged in the piston sliding direction at the fitting portion F1, and a first fitting surface 22h be formed between the first recesses 22g and 22g and a second fitting surface 31b be formed between the second recesses 31a and 31a.

It is also preferable that the plurality of first recesses 22g be equal to each other in width L11 in the piston sliding direction, the plurality of second recesses 31a be equal to each other in width L21 in the piston sliding direction, and a sum L13 of the width L11 of the one first recess 22g and the width L12 of the one first fitting surface 22h be equal to a sum L23 of the width L21 of the one second recess 31a and the width L22 of the one second fitting surface 31b.

Further, it is preferable that the width L11 of the first recess 22g be equal to the width L21 of the second recess 31a and the width L11 of the first recess 22g be larger than the width L12 of the first fitting surface 22h.

Alternatively, it is preferable that the width L11 of the first recess 22g be equal to the width L21 of the second recess 31a and the width L11 of the first recess 22g be equal to the width L12 of the first fitting surface 22h.

Further, it may be configured such that the plurality of first recesses 22g be equal to each other in width L11 in the piston sliding direction, the plurality of second recesses 31a be equal to each other in width L21 in the piston sliding direction, the plurality of first fitting surfaces 22h be equal to each other in width L12 in the piston sliding direction, the plurality of second fitting surfaces 31b be equal to each other in width L22 in the piston sliding direction, the width L12 of the first fitting surface 22h be equal to the width L22 of the second fitting surface 31b, and either one of the width L11 of the first recess 22g and the width L21 of the second recess 31a be equal to the width L12 of the first fitting surface 22h, and the other be a multiple of 2 of the width L12 of the first fitting surface 22h.

Effects of the Invention

According to the gas cushion device of the present invention, when the piston is depressed into the cylinder, a frictional force (friction cushion force) due to the interference fit between the inner surface of the cylinder and the outer surface of the piston is obtained in addition to the repulsive force (gas cushion force) due to the gas. Therefore, a higher cushion force can be obtained as compared with a conventional gas cushion device in which a cushion force is obtained only by a repulsive force due to a gas. Further, although frictional heat is generated due to sliding, since the oil feeding mechanism is provided to feed a lubricating oil to the fitting portion, the fitting portion can be cooled, which prevents seizure and sticking. Thus, a stable friction cushion force can be obtained over a long period of time.

In a gas cushion, the cushion force increases as the piston is depressed. Especially in cases where the size is reduced, the increase rate of the cushion force with respect to the depressed amount is large. If the cushion force changes greatly, for example, the pressing force to the workpiece becomes inappropriate, causing cracking or breaking in the workpiece. However, if the piston is reduced in diameter from the inner side of the cylinder to the outer side thereof, the friction cushion force due to the interference fit is decreased as the piston is depressed. For this reason, in the sum of the gas cushion force and the friction cushion force, the increase rate of the cushion force can be decreased or eliminated, and conversely the cushion force can be decreased.

By the way, the frictional force due to the interference fit between the inner surface of the cylinder and the outer surface of the piston always acts in a direction in which the relative motion of the cylinder and the piston is prevented. In other words, the gas cushion force always acts in a direction in which the piston is pulled out (pushed out) of the cylinder, whereas when the piston is pulled out of the cylinder, the frictional force due to the interference fit acts in a direction in which the piston is depressed into the cylinder (acts to resist the pulling out). However, when the frictional force due to the interference fit is smaller than the repulsive force due to the gas, the piston automatically returns to its original position at which the piston was positioned before being depressed when depressing of the piston is released. Therefore, there is no need to separately provide a device or the like for returning the piston.

In cases where a space is formed between the cylinder and the piston so that a volume of the space is increased when the piston is depressed and the volume of the space is decreased when the piston is pulled out, and the space constitutes a pump of the oil feeding mechanism, there is no need to separately provide a pump for feeding a lubricating oil to the fitting portion.

In cases where the cylinder is provided with a plurality of first recesses arranged in a piston sliding direction at the fitting portion, the piston is provided with a plurality of second recesses arranged in the piston sliding direction at the fitting portion, a first fitting surface is formed between the first recesses, and a second fitting surface is formed between the second recesses, as the piston is depressed, the area of the fitting portion between the first fitting surface and the second fitting surface changes, which in turn can change the strength of the friction cushion force.

In cases where the plurality of first recesses is equal to each other in width in the piston sliding direction, the plurality of second recesses is equal to each other in width in the piston sliding direction, the plurality of first fitting surfaces is equal to each other in width in the piston sliding direction, the plurality of second fitting surfaces is equal to each other in width in the piston sliding direction, and a sum of the width of the one first recess and the width of the one first fitting surface is equal to a sum of the width of the one second recess and the width of the one second fitting surface, it is possible to obtain a friction cushion force that increases and decreases at equal periods.

In cases where the width of the first recess is equal to the width of the second recess, and the width of the first recess is greater than the width of the first fitting surface, it is possible to generate a section in which the fitting portion between the first fitting surface and the second fitting surface is not formed at equal periods.

In cases where the width of the first recess is equal to the width of the second recess, and the width of the first recess is equal to the width of the first fitting surface, it is possible to obtain a friction cushion force that changes in a triangular wave.

In cases where the plurality of first recesses is equal to each other in width in the piston sliding direction, the plurality of second recesses is equal to each other in width in the piston sliding direction, the plurality of first fitting surfaces is equal to each other in width in the piston sliding direction, the plurality of second fitting surfaces is equal to each other in width in the piston sliding direction, the width of the first fitting surface is equal to the width of the second fitting surface, either one of the width of the first recess and the width of the second recess is equal to the width of the first fitting surface, and the other is a multiple of 2 of the width of the first fitting surface, the area of the fitting portion between the first fitting surface and the second fitting surface becomes constant. However, in this case, since the same first fitting surface does not continuously fit to the second fitting surface, it is advantageous in terms of cooling.

BRIEF DESCRIPTION OF THE DRAWINGS

FIG. 10A is a cross-sectional view of a main part showing a cylinder provided with first recesses, FIG. 10B is an enlarged view of the first recess, FIG. 10C is a cross-sectional view of a main part showing a piston provided with second recesses, and FIG. 10D is an enlarged view of the second recess.

FIG. 11 is a cross-sectional view of a main part showing a change in the fitting portion due to depressing of a piston.

EMBODIMENTS FOR CARRYING OUT THE INVENTION

Figure 1:
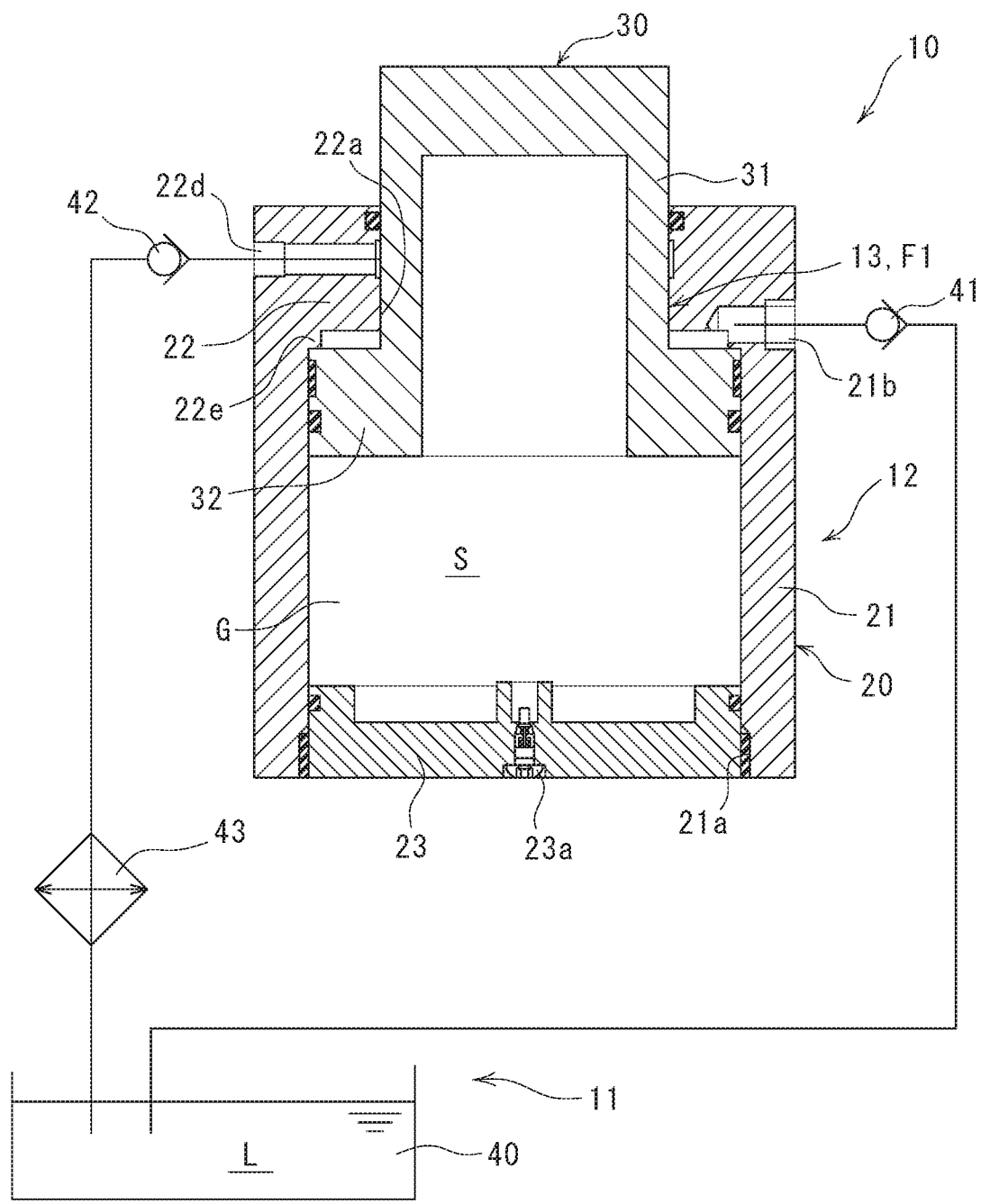
FIG. 1 is a cross-sectional view showing a gas cushion device of the present invention.

The gas cushion device 10 shown in FIG. 1 to FIG. 3 is provided with a cylinder 20, a piston 30 slidably fitted in the cylinder 20, a gas G enclosed in the cylinder 20 to energize the piston 30, and an oil feeding mechanism 11 for feeding a lubricating oil L to the fitting portion F1 between the cylinder 20 and the piston 30. Note that the cylinder 20 and the piston 30 are fitted in an interference fit state. That is, the gas cushion device 10 is provided with a gas cushion mechanism 12 by the gas G and a friction cushion mechanism 13 by the interference fit. With this, it is configured such that a repulsive force (gas cushion force) by the gas G and a frictional force (friction cushion force) by the interference fit are obtained. Hereinafter, each constituent component will be described in detail, but note that the "upper/lower" and the "left/right" in the description denote upper/lower and left/right in the drawing and do not define the direction in the use state.

First, the gas cushion mechanism 12 will be described. As shown in FIG. 1, the gas cushion mechanism 12 is constituted by inserting the piston 30 in the cylinder 20 and sealing the gas G in a sealing chamber S constituted by the cylinder 20 and the piston 30.

The cylinder 20 is provided with a main body portion 21 for housing the piston 30, an inward flange portion 22 provided at the upper end of the main body portion 21, and a lid portion 23 that closes the lower end of the main body portion 21. More specifically, the main body portion 21 is formed in a substantially cylindrical shape having openings 21a and 22a at both axial end portions. The inward flange portion 22 extends radially inward from the upper end of the main body portion 21 and narrows the diameter of the upper side opening 22a. The inner circumferential surface of the inward flange portion 22 is classified roughly into a cylinder side fitting portion Fs to be fitted to an outer peripheral surface (piston side fitting portion Fp) of the shaft portion 31 of the piston 30 which will be described later, an annular groove 22c which has an inner diameter larger than the diameter of the cylinder side fitting portion Fs and forms a gap between the annular groove and the piston side fitting portion Fp, and a seal material retaining portion 22f for retaining a sealing material for sealing between the inner peripheral surface of the inward flange portion 22 and the outer peripheral surface of the shaft portion 31 of the piston 30 (see FIG. 2A). The lid portion 23 is formed in a substantially disk-shape and closes the lower side opening 21a of the main body portion 21.

The piston 30 is provided with a shaft portion 31 that goes in and out of the cylinder 20 and a piston main body portion 32 that receives the pressure of the gas G. More specifically, the shaft portion 31 is formed in a substantially cylindrical shape in which its upper end is closed, and the outer diameter thereof is substantially the same as the diameter of the upper side opening 22a of the cylinder 20. The piston main body portion 32 extends radially outward from the lower end of the shaft portion 31 and has an outer diameter substantially equal to the inner diameter of the main body portion 21 of the cylinder 20.

The sealing chamber S is constituted by the inner surface (upper surface) of the lid portion 23 of the cylinder 20, the inner peripheral surface of the main body portion 21, the lower surface of the piston main body portion 32 of the piston 30, and the inner surface of the hollow shaft portion 31. In order to prevent gas leakage from the sealing chamber S, a seal is provided between the parts. Specifically, between the outer peripheral surface of the lid portion 23 and the inner peripheral surface of the main body portion 21, and between the inner peripheral surface of the main body portion 21 and the outer peripheral surface of the piston main body portion 32, a sealing material, such as a sealing ring and a gasket, is provided, respectively.

When the sealing chamber S is filled with the gas G from the injection valve 23a provided in the lid portion 23, the piston 30 is urged upward by the pressure of the gas G. This urging force becomes the initial value of the gas cushion force. When the piston 30 is depressed into the cylinder 20, the volume of the sealing chamber S is decreased, which compresses the gas G. As a result, the gas cushion force is increased. The above is the configuration and function of the gas cushion mechanism 12.

Subsequently, the friction cushion mechanism 13 will be described. In the gas cushion device 10 of the present invention, for the purpose of obtaining a friction cushion force, the inner peripheral surface of the inward flange portion 22 of the cylinder 20 and the outer peripheral surface of the shaft portion 31 of the piston 30 are fitted in an interference fit state. Specifically, the outer diameter of the shaft portion 31 is made slightly larger than the inner diameter of the upper side opening 22a (cylinder side fitting portion Fs) of the cylinder 20 so as to attain a fit with interference. The interference is absorbed by elastically expanding the opening 22a and elastically contracting the shaft portion 31. Therefore, the piston 30 continuously maintains the slidable state with respect to the cylinder 20.

Figure 2A:
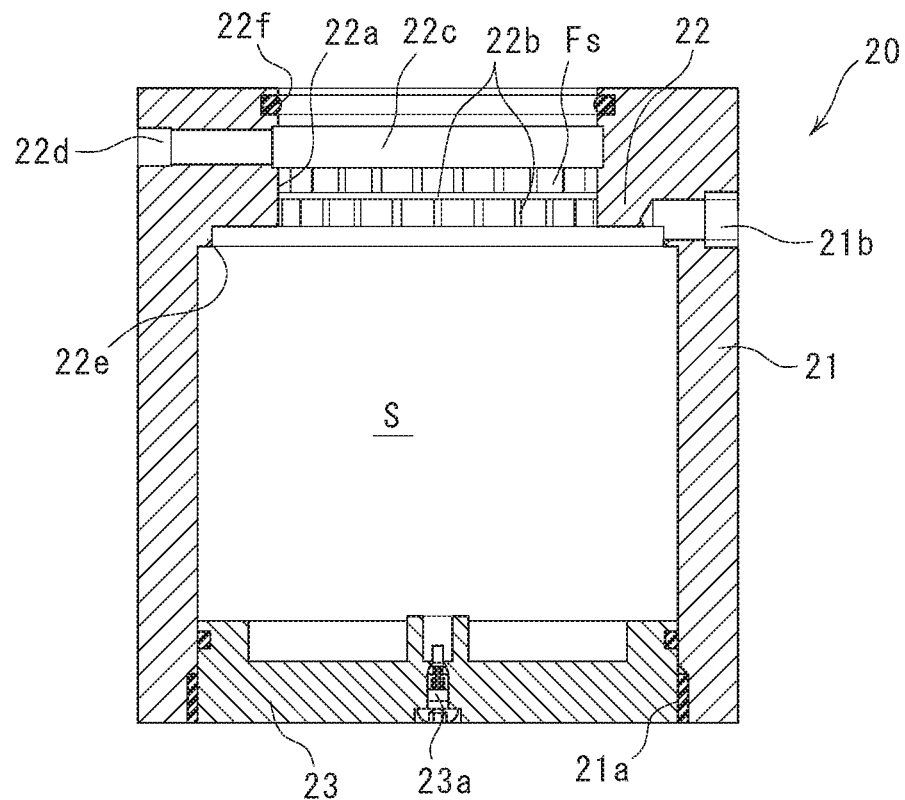
FIG. 2A is a cross-sectional view of a cylinder.
Figure 2B:
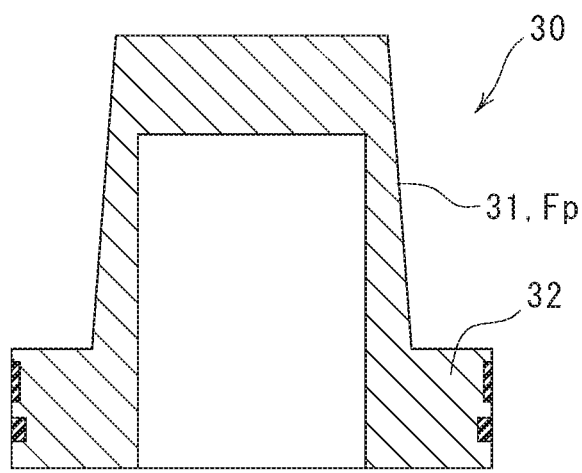
FIG. 2B is a cross-sectional view of a piston.

Further, as shown in FIG. 2B, the shaft portion 31 of the piston 30 is reduced in diameter in the axial direction from the inside of the cylinder 20 to the outside of the cylinder 20. Note that in FIG. 2B, the diameter reduction degree is exaggeratedly depicted. When formed as described above, the interference is gradually decreased as the depressed amount of the piston 30 is increased, and the frictional force generated in the fitting portion F1 is gradually decreased. As a result, a change (increase) in the gas cushion force caused by depressing of the piston 30 can be reduced or canceled by the change in friction cushion force.

As the frictional force by the interference fit, it is preferable to make it smaller than the gas cushion force (repulsive force by the gas). When the gas cushion device 10 is incorporated in a press machine, the piston 30 is depressed during the pressing process, but the piston 30 automatically returns to its original position at which the piston was positioned before being depressed by the gas cushion force.

Note that when the piston 30 slides, frictional heat is generated at the fitting portion F1. Therefore, the gas cushion device 10 is provided with an oil feeding mechanism 11 configured to feed a lubricating oil to the fitting portion F1 to remove the frictional heat and prevent seizure of the piston 30. More specifically, as shown in FIG. 2A, oil grooves 22b for passing the lubricating oil L are provided on the cylinder side fitting portion Fs (the inner surface of the opening 22a). This oil groove 22b is provided in a broken joint pattern. However, it may be formed in a spiral pattern or a lattice pattern.

Figure 3A:
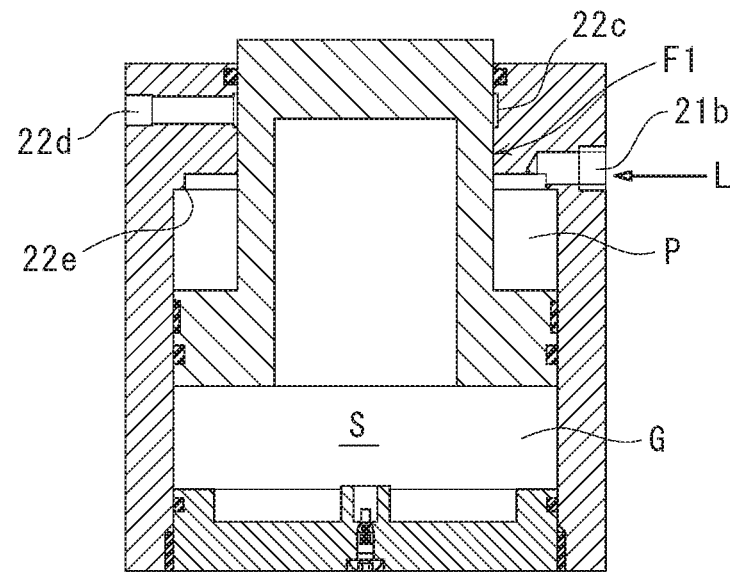
FIG. 3A is a cross-sectional view when the piston is in a descended state.

The lower side of the oil groove 22b communicates with a substantially annular space P formed between the lower surface of the inward flange portion 22 of the cylinder 20 and the upper surface of the piston main body portion 32 of the piston 30 (see FIG. 3A). On the side surface of the main body portion 21 of the cylinder 20, an opening 21b communicating the space P with the outside is provided, and the space P is connected to the oil tank 40 through the opening 21b.

Figure 3B:
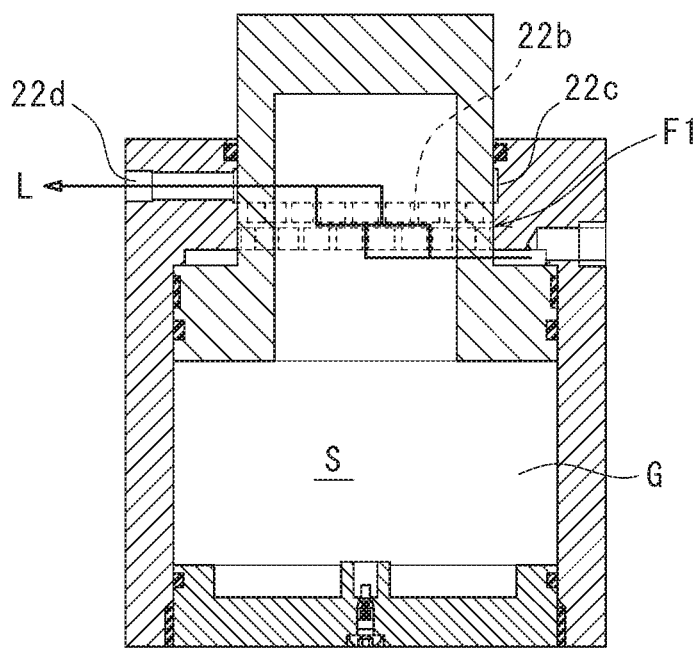
FIG. 3B is a cross-sectional view when the piston is in an ascended state.

As shown in FIG. 3A and FIG. 3B, the space P is increased in volume when the piston 30 is depressed into the cylinder 20, and the space P is decreased in volume when the piston 30 is raised (pulled out of the cylinder 20). Therefore, when the piston 30 is depressed, it functions as a pump which takes in the lubricating oil L from the oil tank 40 and discharges the lubricating oil L when the piston 30 is pulled out. The space P and the oil tank 40 are connected via a check valve 41. The check valve 41 may be built in the cylinder 20. With this, the lubricating oil L flows only in one direction. Specifically, the lubricating oil flows from the space P toward the oil grooves 22b.

An annular groove 22c continuously extending in the circumferential direction of the cylinder 20 is provided on the upper side of the oil grooves 22b. This annular groove 22c serves as a portion for collecting the lubricating oil L dispersed all around the shaft portion 31 of the piston 30 through the oil grooves 22b. Further, in the inward flange portion 22 of the cylinder 20, an opening 22d communicating the annular groove 22c with the outside is provided. This opening 22d is communicated with the oil tank 40 via a check valve 42 and a cooler 43. Therefore, the lubricating oil L flowing through the oil grooves 22b returns to the oil tank 40 via the annular groove 22c. A sealing material, such as, e.g., a seal ring and a gasket, is provided on the upper side of the annular groove 22c to prevent leakage of the lubricating oil L from between the inner peripheral surface of the inward flange portion 22 of the cylinder 20 and the outer peripheral surface of the shaft portion 31 of the piston 30.

As described above, since the lubricating oil L is automatically supplied to the fitting portion F1 in accordance with the ascending and descending movement of the piston 30, there is no need to separately provide a circulation pump or the like. In particular, when the friction cushion force is set to be smaller than the gas cushion force, the pump function can be demonstrated by the mere depressing operation of the piston 30. In order to ensure a lubricating oil path, a protrusion 22e as a distance retaining portion is provided on the lower surface of the inward flange portion 22 of the cylinder 20 so as not to block the opening 21b with the piston 30.

Although the oil feeding mechanism 11 is described above, in order to prevent seizure and/or abrasion, it is preferable to apply a curing treatment such as a radical nitriding treatment to the cylinder side fitting portion Fs. The surface hardness is preferably set to about 45 to about 49 in Rockwell C scale (HRC). It is also preferable to subject the outer peripheral surface of the shaft portion 31 which is the piston side fitting portion Fp to a curing treatment such as low temperature TiC coating. The surface hardness is preferably set to about 55 to about 65 in Rockwell C scale (HRC).

Furthermore, it is preferable that the cylinder side fitting portion Fs and the piston side fitting portion Fp be finished very smoothly with an arithmetic mean roughness Ra of 0.2 μm or less. As for the lower limit, for the purpose of, e.g., maintaining the oil film, it is preferable to set the arithmetic mean roughness Ra to 0.01 μm or more, more preferably 0.08 μm or more considering the ease of processing. Therefore, the arithmetic mean roughness Ra is preferably within the range of 0.01 μm to 0.2 μm, particularly within the range of 0.08 μm to 0.2 μm.

In addition, it is preferable that the cylinder 20 and the piston 30 be made of a material having nearly the same thermal expansion coefficient or the same material. With this, even if thermal expansion occurs, it expands in the same way, so that it is possible to suppress a change in sliding frictional force. Note that the cylinder 20 is preferably produced from carbon steel, particularly alloy tool steel such as SKD 61 of JIS standard. Further note that the piston 30 is preferably produced from carbon steel, particularly cold die steel such as DC53 of JIS standard.

Example 1

Hereinafter, concrete examples will be described. When the inner diameter of the main body portion 21 of the cylinder 20 is 100 mm, the cylinder effective height (the distance from the upper surface of the lid portion 23 to the lower surface of the piston main body portion 32 when the piston main body portion 32 is brought into contact with the protrusion 22e) is 105 mm, and the inner diameter of the shaft portion 31 of the piston 30 is 56 mm, and the effective height in the piston (the vertical length of the hollow portion provided in the piston 30) is 110 mm, the volume of the sealing chamber S before the piston was depressed is 1,095,598.8 mm³. Also, the volume of the sealing chamber S after the piston is depressed (depressed by 30 mm) is 859,979.4 mm³. When the filling pressure of the gas G is 15.2 MPa, the gas cushion force becomes 119 kN before depressing the piston, 152 kN after depressing the piston, and the gas cushion force increases by 33 kN.

On the other hand, when the shaft portion 31 is formed in a constant gradient taper shape so that the outer diameter of the shaft portion 31 of the piston 30 is 80.14 mm at the position before depressing the piston and 80.07 mm at the position after depressing the piston, the inner diameter of the inward flange portion 22 of the cylinder 20 (the inner diameter of the cylinder side fitting portion Fs) is made constant at 80 mm, and the fitting length (the axial length of the fitting portion F1) is 25 mm, the friction cushion force is 69 kN before depressing the piston, 35 kN after depressing the piston, and the friction cushion force decreases by 34 kN.

Figure 4:
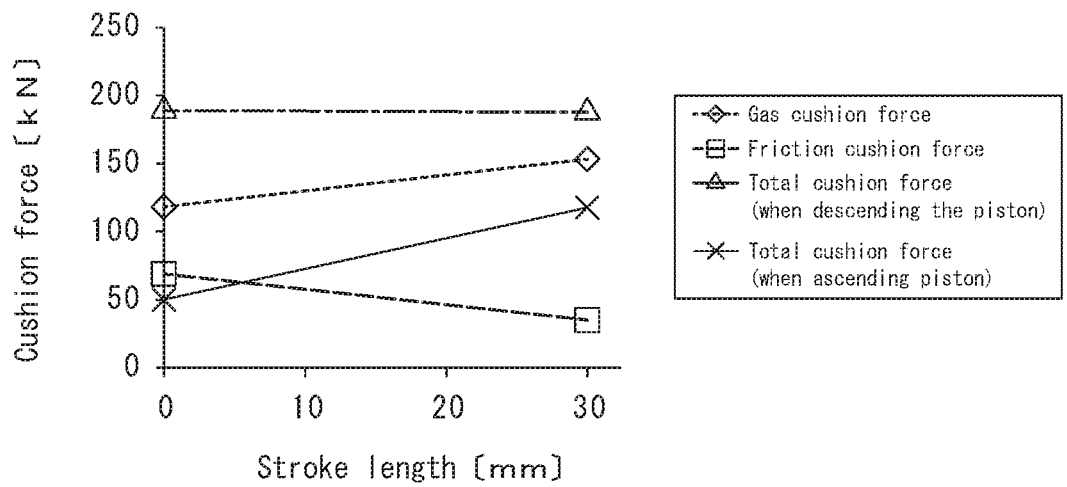
FIG. 4 is a graph showing the cushion force of Example 1.

Therefore, the sum of the gas cushion force and the friction cushion force (total cushion force) is almost unchanged before and after depressing the piston, and almost constant cushion force can be obtained (see FIG. 4).

The friction cushion force (frictional resistance) F is calculated by the product of the surface pressure p generated on the intermetallic (sliding surface) due to the interference fit, the area where the surface pressure acts, and the friction coefficient k. The relationship between the interference 6 due to fitting and the generated surface pressure p is expressed by Equation 1.

$$p = \frac{\delta}{D_1\left\{\dfrac{1}{E_1} + \dfrac{D_2^2 + D_1^2}{E_2(D_2^2 - D_1^2)} + \dfrac{v_2}{E_2} - \dfrac{v_1}{E_1}\right\}} \quad \text{[Equation 1]}$$

where δ is the interference, vi is the Poisson's ratio of the piston, $v_2$ is the Poisson's ratio of the cylinder, $E_1$ is the Young's modulus of the piston, $D_1$ is the fitting diameter of the piston, $E_2$ is the Young's modulus of the cylinder, and $D_2$ is the outer diameter of the cylinder.

The friction cushion force F is a product of the surface pressure p, the friction coefficient μ and the sliding area S at the sliding surface. Since the sliding area S is $\pi \times D_1 \times L$, the friction cushion force F is given by Equation 2.

$$F = p \times \mu \times (\pi \times D_1 \times L) \quad \text{[Equation 2]}$$

For the friction coefficient k, a dynamic friction coefficient is adopted when the piston is moving, and a static friction coefficient is adopted until the piston starts moving from a stationary state. L denotes a fitting length (axial direction).

By the way, the maximum value of the friction cushion force is 69 kN, which is smaller than the minimum value of the gas cushion force 119 kN. Therefore, when the depressing of the piston 30 is terminated, the piston returns to its original position at which the piston was positioned before being depressed by the gas cushion force.

Example 2

Figure 5:
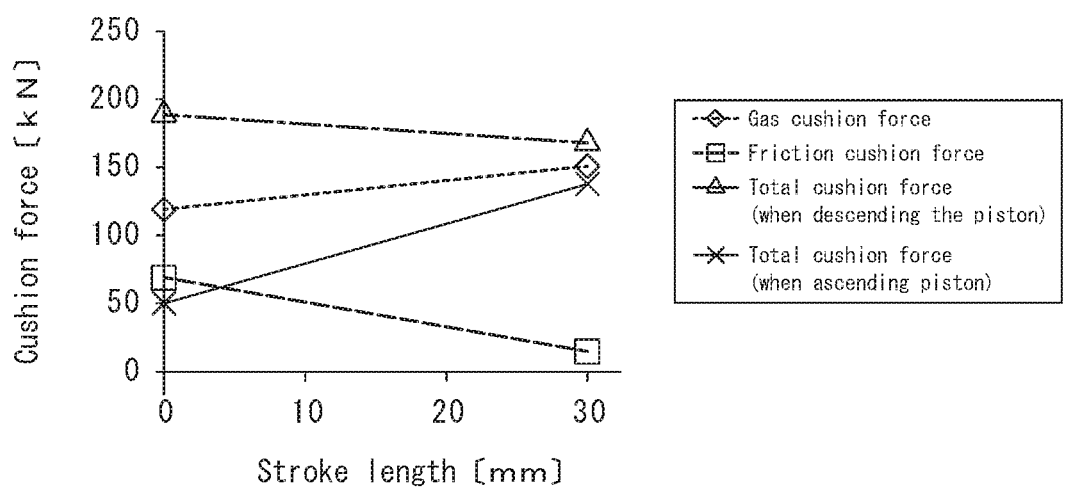
FIG. 5 is a graph showing the cushion force of Example 2.

Subsequently, an example will be described in which the total cushion force decreases as the piston 30 is depressed. In this example, the shaft portion 31 of the piston 30 is formed in a constant gradient taper shape so that the outer diameter of the shaft portion 31 of the piston 30 is 80.14 mm at the position which is a position before the piston is depressed and is 80.03 mm at a position which is a position after the piston is depressed. The configuration of the other parts is the same as that of the first example. In this case, the friction cushion force is 69 kN before depressing the piston and 15 kN after depressing the piston. Since the gas cushion force is the same as that in Example 1, the total cushion force is 188 kN before depressing the piston and 167 kN after depressing the piston, and the cushion force decreases as the piston is depressed (see FIG. 5).

Example 3

Figure 6:
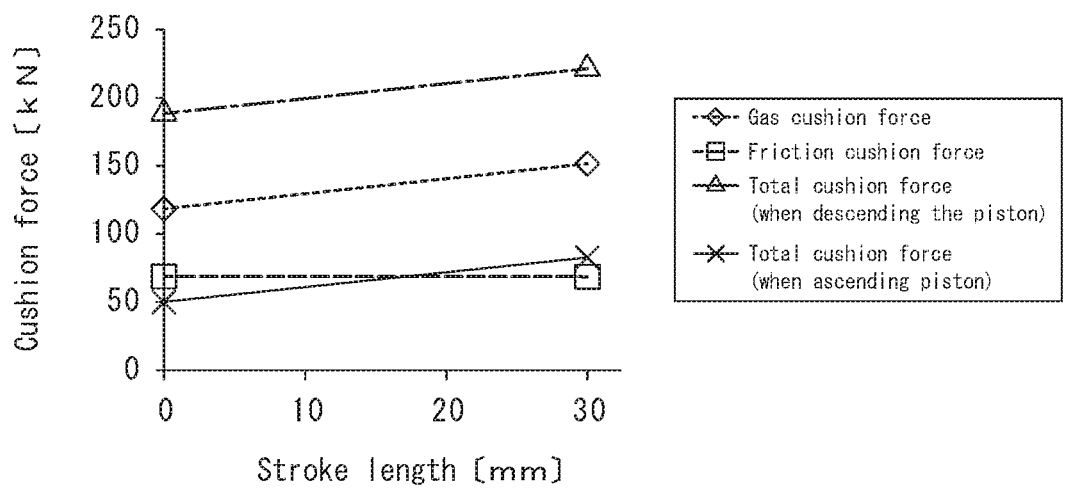
FIG. 6 is a graph showing the cushion force of Example 3.

Next, an example will be described in which the total cushion force increases as the piston 30 is depressed. In this example, the outer diameter of the shaft portion 31 of the piston 30 is set to 80.14 mm at the position before depressing the piston and 80.14 mm at the position after depressing the piston. That is, the outside diameter of the shaft portion 31 is set to be constant without being changed. The configuration of the other parts is the same as that of the first example. In this case, the friction cushion force is 69 kN which is unchanged before and after depressing the piston. Since the gas cushion force is the same as that in Example 1, the total cushion force is 188 kN before depressing the piston and 221 kN after depressing the piston, and the cushion force increases as the piston 30 is depressed (see FIG. 6).

Figure 7A:
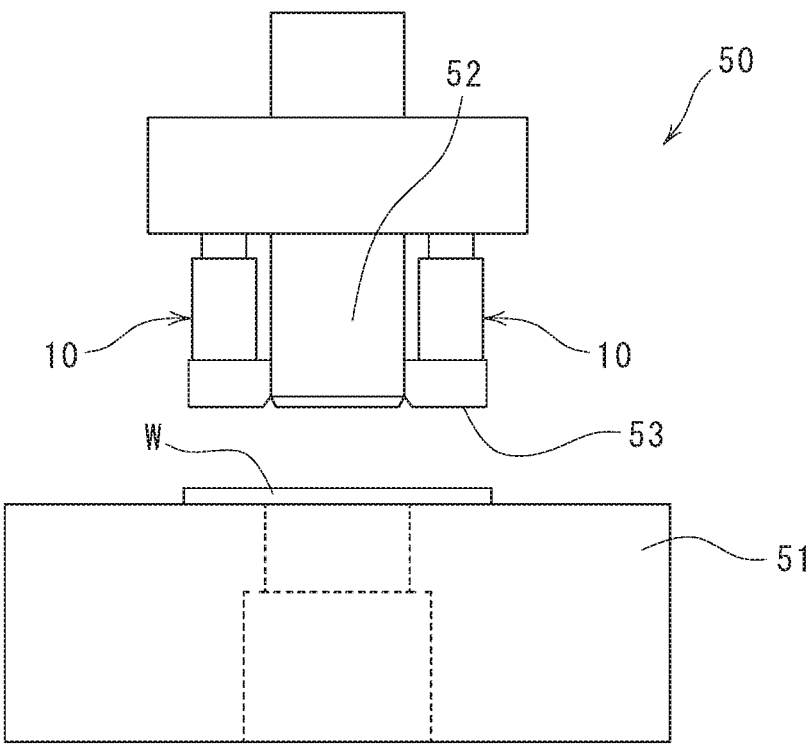
FIG. 7A is a schematic diagram showing a press machine in which the gas cushion device of the present invention is incorporated.
Figure 7B:
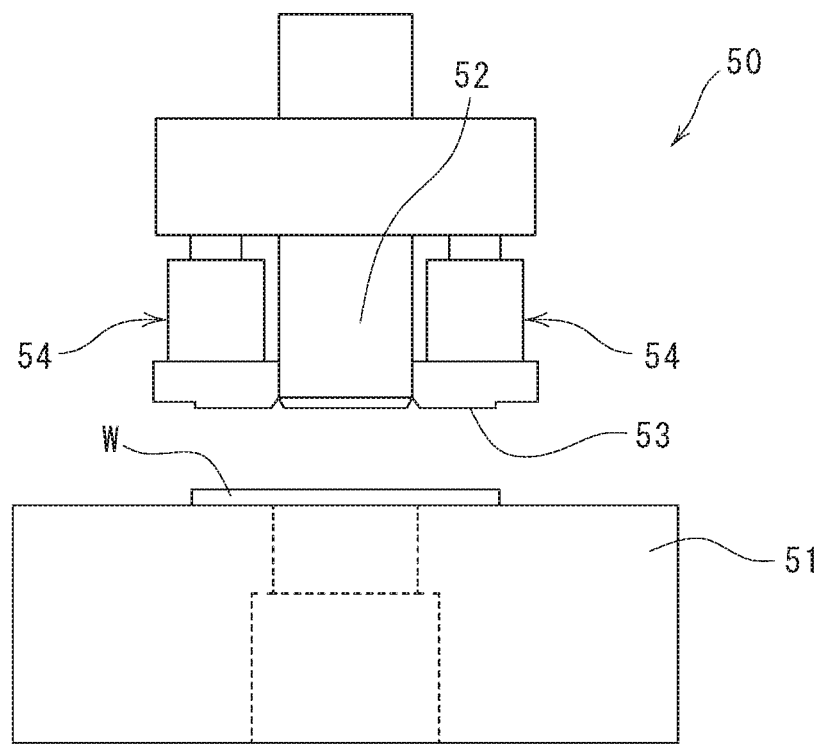
FIG. 7B is a schematic diagram showing a press machine in which a conventional gas cushion device is incorporated.

The gas cushion device 10 having the above configuration is used by being incorporated into, for example, a press machine. FIG. 7A shows a state in which the gas cushion device 10 is used as a die spring of a press machine. The press machine 50 is provided with a die 51 for placing a workpiece W, a punch 52 for punching the workpiece W, and a pressing portion 53 for pressing the workpiece W. The gas cushion device 10 is arranged behind (on the upper side of) the pressing portion 53 so that an appropriate pressing force can be applied to the pressing portion 53. FIG. 7B shows a state in which a conventional gas cushion device 54 for obtaining a cushion force only by a repulsive force of a gas is incorporated in the press machine 50. As can be seen from the comparison with the gas cushion device 10 of FIG. 7A, in the conventional gas cushion device 54, the outer diameter is larger than that of the gas cushion device 10 of the present invention to obtain the necessary cushion force. In this case, since the gas cushion device 54 is arranged away from the punch 52, the amount of eccentricity increases, generating a moment when a cushion force is transmitted to the pressing portion 53, which may sometimes deteriorate the accuracy of the punched surface.

Figure 8A:
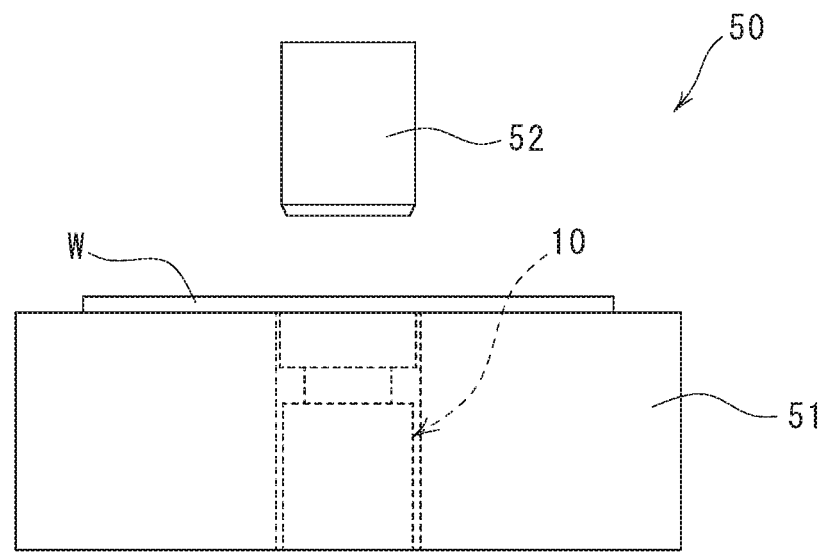
FIG. 8A is a schematic diagram showing a press machine in which the gas cushion device of the present invention is incorporated.
Figure 8B:
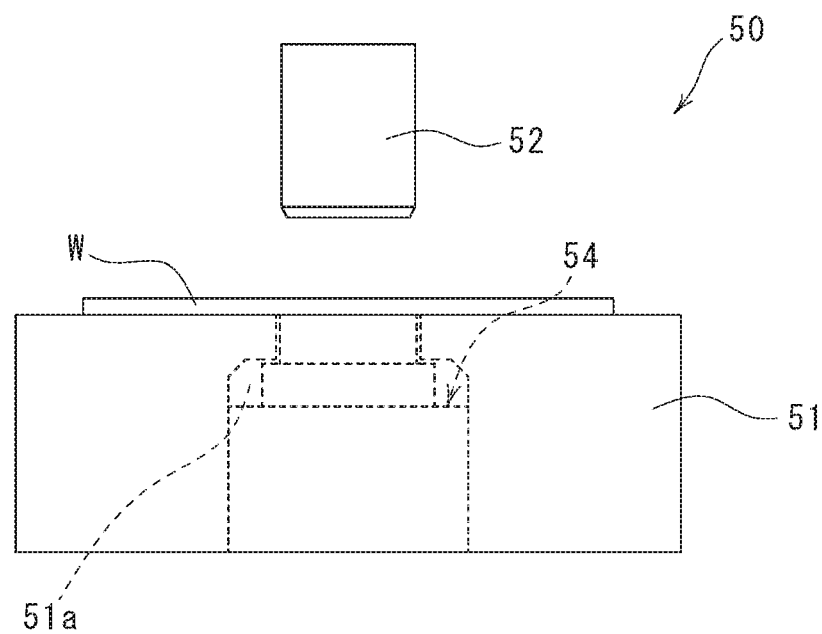
FIG. 8B is a schematic diagram showing a press machine in which a conventional gas cushion device is incorporated.

FIG. 8A shows a gas cushion device 10 of the present invention, and FIG. 8B shows a state in which a conventional gas cushion device 54 is used as a die cushion of a press machine 50. As described above, the conventional gas cushion device 54 has a larger outer diameter than the gas cushion device 10 of the present invention in order to obtain the required cushion force. As a result, the die lower gouged portion 51a of the lower die is required, which lowers the lower die rigidity. This in turn makes it difficult to perform high precision processing. In any of the examples, it is possible to obtain a higher cushion force as compared with a gas cushion device consisted only by a gas cushion. Therefore it is possible to raise the die rigidity and reduce the number of gas cushion devices to be arranged. Further, in the case of Example 1, since the pressing force does not change during pressing, occurrence of cracking and/or breaking of the workpiece W can be suppressed.

Figure 9:
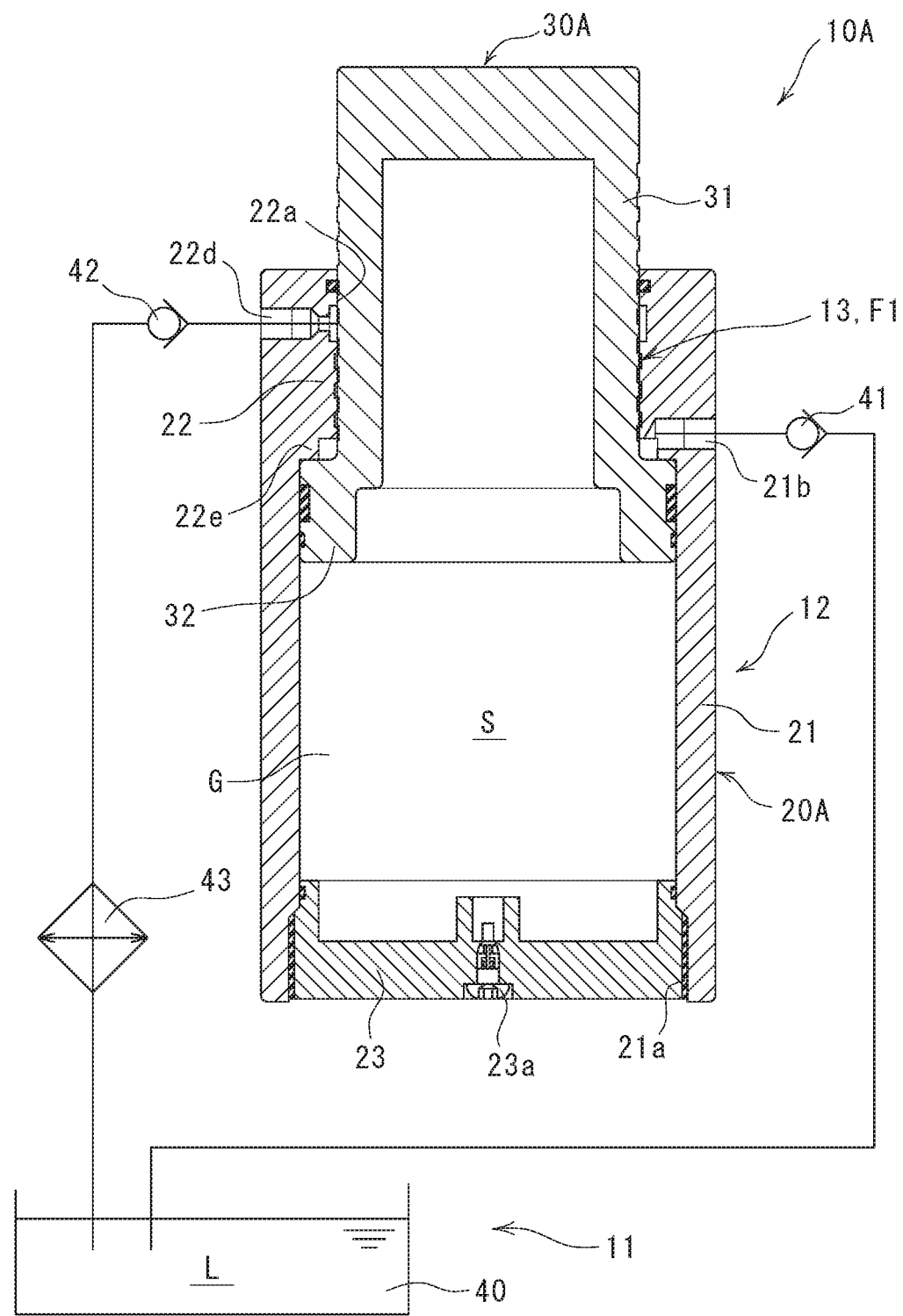
FIG. 9 is a cross-sectional view showing a gas cushion device according to a different embodiment of the present invention.

Next, a gas cushion device 10A capable of obtaining a friction cushion force in a pulse wave shape will be described. As shown in FIG. 9, FIG. 10A, and FIG. 10C, in this gas cushion device 10A, the cylinder 20A is provided with a plurality of first recesses 22g arranged in the piston sliding direction (the axis direction of the cylinder 20A and the piston 30A) at the fitting portion F1 of the cylinder 20A and the piston 30A. More specifically, a plurality of first recesses 22g is provided on the inner peripheral surface of the inward flange portion 22 of the cylinder 20A. More specifically, a plurality of first recesses 22g is provided at the cylinder side fitting portion Fs. Between the first recesses 22g and 22g, a first fitting surface 22h to which the piston 30A (specifically, the second fitting surface 31b which will be described later) is fitted in an interference fit state is formed. Further, the piston 30A is provided with a plurality of second recesses 31a arranged in the piston sliding direction at the fitting portion F1. More specifically, a plurality of second recesses 31a is provided on the outer peripheral surface of the shaft portion 31 of the piston 30A. More specifically, a plurality of second recesses 31a is provided on the piston side fitting portion Fp. Between the second recess 31a and 31a, a second fitting surface 31b to which the first fitting surface 22h is fitted in an interference fit state is formed. Both the first recess 22g and the second recess 31a are annular and continuously extend in the circumferential direction.

By the way, the widths L11 of the plurality of first recesses 22g in the piston sliding direction are equal to each other, the widths L21 of the plurality of second recesses 31a in the piston sliding direction are equal to each other, the widths L12 of the plurality of first fitting surfaces 22h in the piston sliding direction are equal to each other, and the widths L22 of the plurality of second fitting surfaces 31b in the piston sliding direction are equal to each other. The sum L13 of the width L11 of one first recess 22g and the width L12 of one first fitting surface 22h is equal to the sum L23 of the width L21 of one second recess 31a and the width L22 of one second fitting surface 31b.

In addition, the width L11 of the first recess 22g is equal to the width L21 of the second recess 31a, and the width L11 of the first recess 22g is equal to the width L12 of the first fitting surface 22h. The depth D1 of the first recess 22g and the depth D2 of the second recess 31a are both equal to or greater than the interference (see FIG. 10B and FIG. 10D). In the gas cushion device 10 shown in FIG. 1, the fitting portion F1 entirely fits in an interference fit state. However, in this gas cushion device 10A, only the first fitting surface 22h and the second fitting surface 31b among the fitting portion F1 of the cylinder 20A and the piston 30A are fitted in an interference fit state.

In the gas cushion device 10A configured as described above, when the piston 30A is depressed, as shown in FIG.

11, the length (area) of the portion where the cylinder 20A and the piston 30A are fitted in an interference fit state changes. In the state (1), the first fitting surface 22h and the second fitting surface 31b are fitted in an interference fit state over the entire length in the piston sliding direction. In the state (2), the second fitting surface 31b is approaching the first recess 22g, and the length of the fitting portion F2 of the first fitting surface 22h and the second fitting surface 31b (the portion fitted in an interference fit state) is halved. When it reaches the state (3), the entire surface of the second fitting surface 31b is positioned at the first recess 22g, and the fitting portion F2 of the first fitting surface 22h and the second fitting surface 31b is not formed. Although not illustrated, when the piston 30A is further depressed in this state, the second fitting surface 31b comes to the first fitting surface 22h, and the fitting portion F2 of the first fitting surface 22h and the second fitting surface 31b is again formed. That is, the area of the fitting portion F2 varies with the depressing of the piston 30A.

Figure 12:
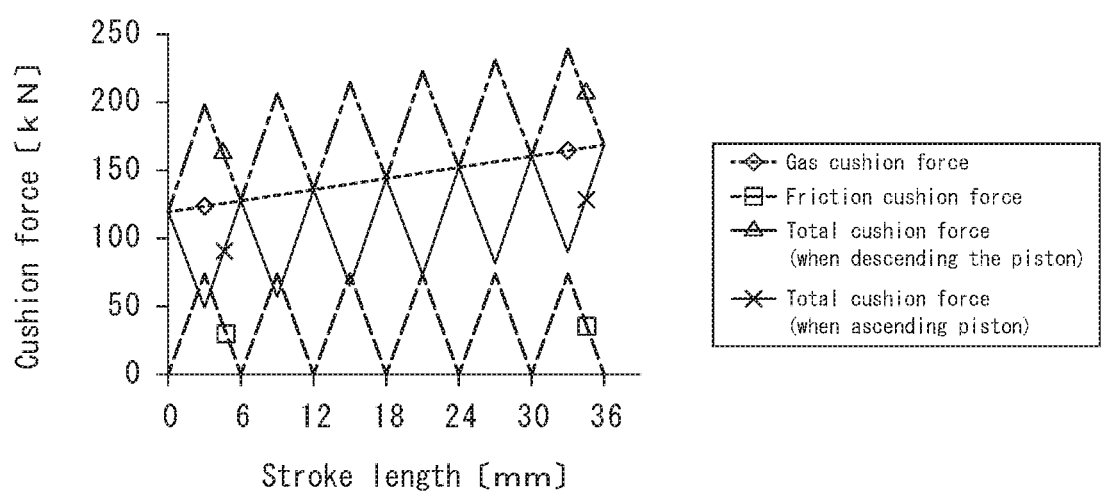
FIG. 12 is a graph showing the cushion force of the gas cushion device shown in FIG. 9.
Figure 13A:
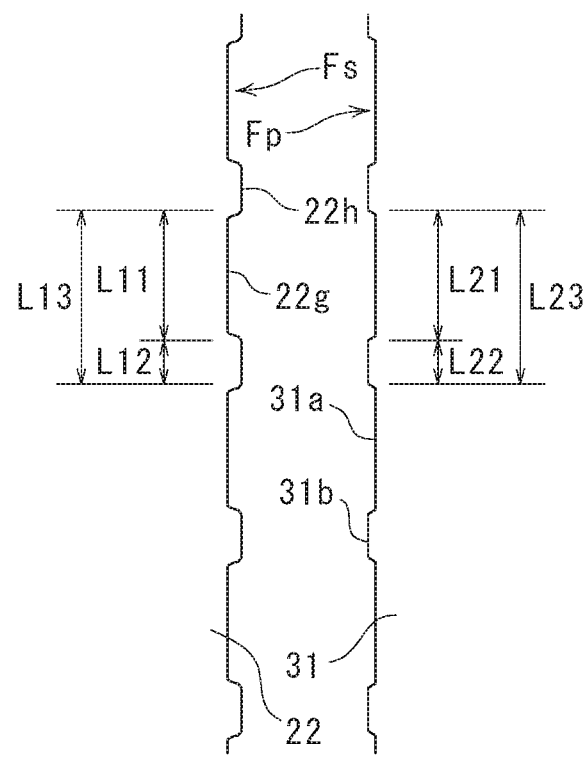
FIG. 13A is a cross-sectional view showing another variation of the fitting portion between the cylinder and the piston.
Figure 13B:
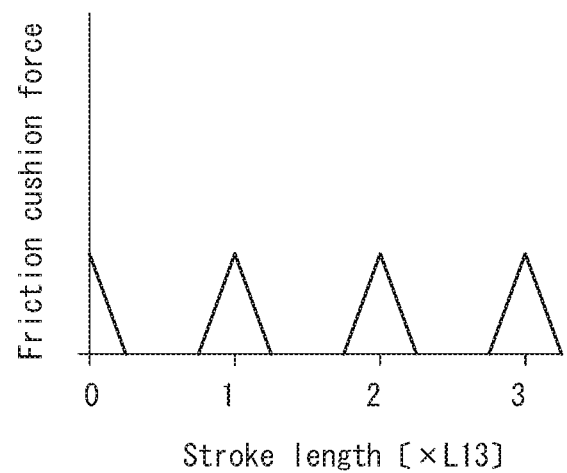
FIG. 13B is a graph showing the friction cushion force obtained by the fitting portion.

Therefore, the friction cushion force becomes a pulse wave shape (triangular wave shape) as shown in FIG. 12. FIG. 12 shows the case in which the width L11 of the first recess 22g in the piston sliding direction, the width L12 of the first fitting surface 22h in the piston sliding direction, the width L21 of the second recess 31a in the piston sliding direction, and the width L22 of the second fitting surface 31b in the piston sliding direction are 3 mm, respectively. The friction cushion force becomes the minimum value (zero) at the intervals of 6 mm, such as at the starting point (when depressed by 0 mm), the point when depressed by 6 mm, the point when depressed by 12 mm, and so on. This is because it becomes the state (3) shown in FIG. 11 every 6 mm depressing. Further, the friction cushion force becomes the maximum value at intervals of 6 mm, such as when depressed by 3 mm, when depressed by 9 mm, when depressed by 15 mm. This is because it becomes the state (1) shown in FIG. 11 every 6 mm depressing.

As described above, in the gas cushion device 10A configured as described above, since a friction cushion force in a pulse wave shape is obtained, it also becomes a pulse wave shape in a total cushion force which is the sum of the gas cushion force and the friction cushion force. Such a total cushion force can be used for the following applications, for example. In drawing, the die cushion force presses the flange portion of the workpiece through the blank holder to suppress occurrence of wrinkles. However, if the die cushion force becomes excessively large, the power to constrain the workpiece becomes too large, causing thinning of the drawn product or occurrence of cracking. In order to suppress occurrence of wrinkles and suppress thickness reduction and cracking, the die cushion force that the blank holder is not pushed back to the workpiece and the force adjustment that the workpiece enters the die as the drawing progresses become necessary. In the case of the gas cushion device 10A configured as described above, since the cushion force increases or decreases in small increments as it is depressed, when used as a die spring of a press machine, it is possible to weaken the press-holding at a stage where drawing is performed to some extent while pressing the workpiece with a sufficient die cushion force, suppressing occurrence of wrinkles and suppressing the thickness reduction and cracking can be achieved at the same time.

FIG. 13 to FIG. 16 show the first recess 22g, the second recess 31a, the first fitting surface 22h, and the second fitting surface 31b which are appropriately changed in length. In FIG. 13A, in addition to the conditions in which the widths L11 of the plurality of first recesses 22g are equal to each other, the widths L21 of the plurality of second recesses 31a are equal to each other, the widths L12 of the plurality of first fitting surfaces 22h are equal to each other, the widths L22 of the plurality of second fitting surfaces 31b are equal to each other, and the sum L13 of the width L11 of one first recess 22g and the width L12 of one first fitting surface 22h is equal to the sum L23 of the width L21 of one second recess 31a and the width L22 of one second fitting surface 31b, the width L11 of the first recess 22g is equal to the width L21 of the second recess 31a, and the width L11 of the first recess 22g is larger than the width L12 of the first fitting surface 22h. In this case, there is a section in which the first fitting surface 22h and the second fitting surface 31b are not fitted during the stroke of the piston 30A. Therefore, a section in which no friction cushion force can be obtained occurs at equal periods, and when a friction cushion force is shown by a graph, a toothless friction cushion force is obtained (see FIG. 13B). In FIG. 13B, the width L11 of the first recess 22g is set to three times the width L12 of the first fitting surface 22h. It is enough that the magnification is larger than 1 times. A section in which a friction cushion force cannot be obtained is generated by the difference between the width L11 of the first recess 22g and the width L12 of the first fitting surface 22h.

Figure 14A:
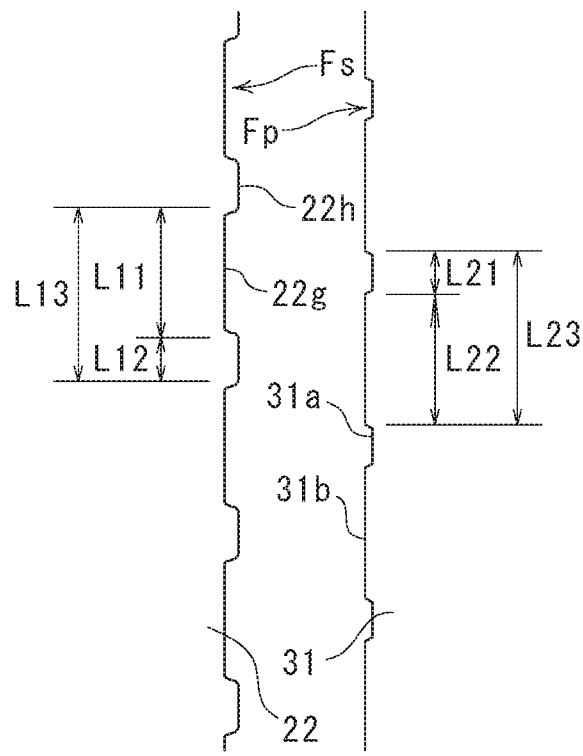
FIG. 14A is a cross-sectional view showing still another variation of the fitting portion between the cylinder and the piston.
Figure 14B:
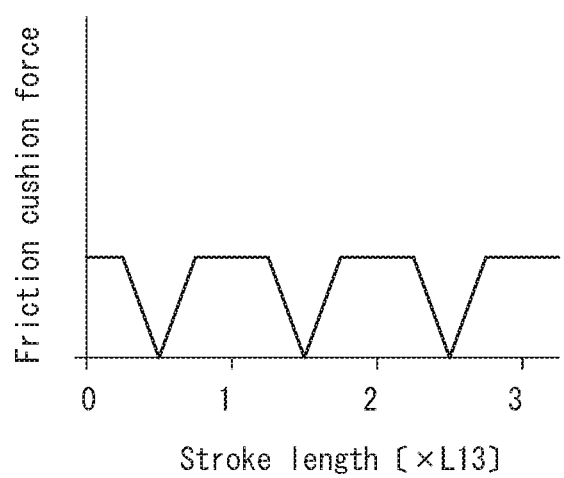
FIG. 14B is a graph showing the friction cushion force obtained by the fitting portion.

In FIG. 14A, in addition to the conditions in which the widths L11 of the plurality of first recesses 22g are equal to each other, the widths L21 of the plurality of second recesses 31a are equal to each other, the widths L12 of the plurality of first fitting surfaces 22h are equal to each other, the widths L22 of the plurality of second fitting surfaces 31b are equal to each other, and the sum L13 of the width L11 of one first recess 22g and the width L12 of one first fitting surface 22h is equal to the sum L23 of the width L21 of one second recess 31a and the width L22 of one second fitting surface 31b, and the width L11 of the first recess 22g and the width L21 of the second recess 31a are different from each other. In this case, the width L12 of the first fitting surface 22h and the width L22 of the second fitting surface 31b inevitably become different. For example, in FIG. 14A, the width L11 of the first recess 22g is three times the width L21 of the second recess 31a, and the width L12 of the first fitting surface 22h is ⅓ times the width L22 of the second fitting surface 31b. In this case, the friction cushion force decreases only when the first fitting surface 22h reaches the second recess 31a (see FIG. 14B). When the width L22 of the second fitting surface 31b is made smaller than this, the section in which a certain friction cushion force can be obtained decreases, causing a section in which no friction cushion force can be obtained. When the width L22 of the second fitting surface 31b is made larger than this, the minimum value does not becomes zero.

Figure 15A:
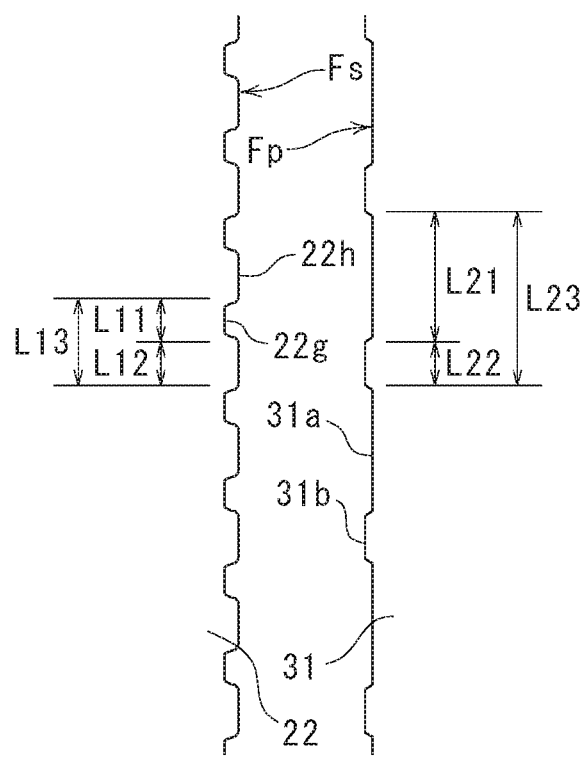
FIG. 15A is a cross-sectional view showing yet another variation of the fitting portion between the cylinder and the piston.
Figure 15B:
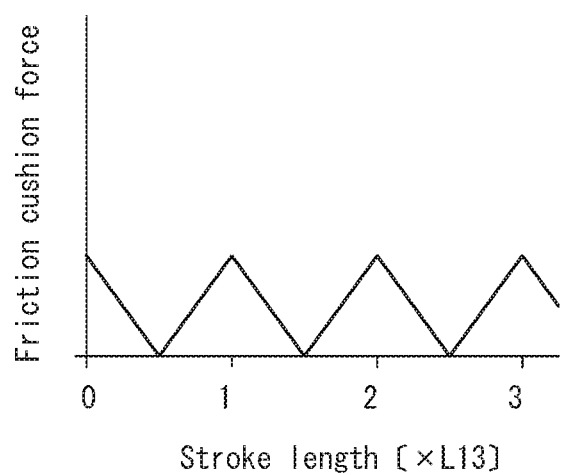
FIG. 15B is a graph showing the friction cushion force obtained by the fitting portion.

In FIG. 15A, in addition to the conditions that the widths L11 of the plurality of first recesses 22g are equal to each other, the widths L21 of the plurality of second recesses 31a are equal to each other, the widths L12 of the plurality of first fitting surfaces 22h are equal to each other and the widths L22 of the plurality of second fitting surfaces 31b are equal to each other, it is set such that the width L11 of the first recess 22g is equal to the width L12 of the first fitting surface 22h, the width L12 of the first fitting surface 22h is equal to the width L22 of the second fitting surface 31b, the width L21 of the second recess 31a is a positive odd multiple (three times) of the width L11 of the first recess 22g. In this case, as shown in FIG. 15B, a friction cushion force having the same waveform as in FIG. 12 is obtained, but since the area of the fitting portion F2 in FIG. 15A is half of that in FIG. 12, the friction cushion force is halved. However, when the area of the fitting portion F2 is halved compared with FIG. 12, heat generation due to friction is halved, and a lubricating oil L easily flows in the second recess 31a having a large width with respect to the width of the first recess 22g, which is advantageous in terms of cooling. Note that as the multiple increases, the friction cushion force decreases.

Figure 16A:
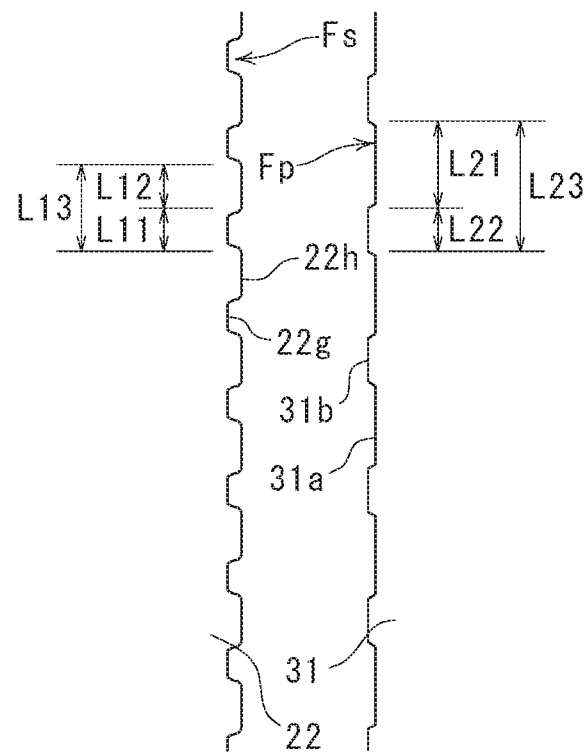
FIG. 16A is a cross-sectional view showing still yet another variation of the fitting portion between the cylinder and the piston.
Figure 16B:
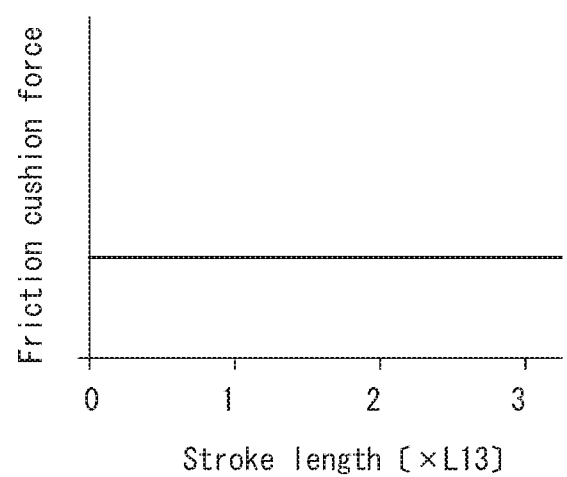
FIG. 16B is a graph showing the friction cushion force obtained by the fitting portion.

In FIG. 16A, it is set such that the widths L11 of the plurality of first recesses 22g are equal to each other, the widths L21 of the plurality of second recesses 31a are equal to each other, the widths L12 of the plurality of first fitting surfaces 22h are equal to each other, the widths L22 of the plurality of second fitting surfaces 31b are equal to each other, the width L12 of the first fitting surface 22h is equal to the width L22 of the second fitting surface 31b, the width L11 of the first recess 22g is equal to the width L12 of the first fitting surface 22h, and the width L21 of the second recess 31a is a multiple of 2 (doubled) of the width L12 of the first fitting surface 22h. It may be configured such that the width L21 of the second recess 31a be equal to the width L12 of the first fitting surface 22h and the width L11 of the first recess 22g be a multiple of 2 of the width L12 of the first fitting surface 22h. In this case, as shown in FIG. 16B, the friction cushion force does not fluctuate during the piston stroke and becomes constant. However, since the width L21 of the second recess 31a is wide, the first fitting surface 22h is less likely to be fitted to the second fitting surface 31b, which is advantageous in terms of cooling.

In the gas cushion device 10A shown in FIG. 9 to FIG. 16, the outer diameter of the piston side fitting portion Fp (specifically, the second fitting surface 31b) is made constant without changing in the piston sliding direction, but it may be tapered. That is, the outer diameter of the piston side fitting portion Fp may be made larger toward the cylinder 20A side (the outer diameter of the piston side fitting portion Fp may be smaller as going away from the cylinder 20A). In this case, the friction cushion force decreases as the depressed amount of the piston 30A increases. Further, as shown in FIG. 12, since the friction cushion force is smaller than the gas cushion force over the entire length of the stroke of the piston 30A, it is not necessary to additionally provide a device or the like for returning the piston to its original position at which the piston was positioned before being depressed. In addition, the first recess 22g and the second recess 31a may be used as oil grooves for feeding the lubricating oil L to the fitting portion F1. The first recess 22g and the second recess 31a are supposed to be annular shapes continuously extending in the circumferential direction of the cylinder 20A or the piston 30A, but are not necessarily required to continuously extend in the circumferential direction. Also, the fitting portion of the interference fit state may be formed also in the first recess 22g or the second recess 31a. In this case, the depths D1 and D2 of the recesses 22g and 31a may be kept within the interference. The width L11 of the first recess 22g, the width L12 of the first fitting surface 22h, the width L21 of the second recess 31a, and the width L22 of the second fitting surface 31b can be appropriately changed. For example, when it is desired to obtain the maximum value every 2 mm depressing of the piston 30A, the widths L11 to L22 may be set to 1 mm.

Other configurations are substantially the same as those of the gas cushion device 10 shown in FIG. 1. For example, a gas G for energizing the piston 30A is enclosed in the cylinder 20A. It is also provided with an oil feeding mechanism 11 that supplies a lubricating oil L to the fitting portion F1 of the cylinder 20A and the piston 30A. Also, between the cylinder 20A and the piston 30A, a space P in which its volume is increased in accordance with depressing of the piston 30A and the volume is decreased by pulling out the piston is formed, and this space P constitutes the pump of the oil feeding mechanism 11. Therefore, the same reference numerals are allotted to similar configurations, and the detailed description thereof will be omitted.

Although embodiments of the present invention are described above, the present invention is not limited to the above described embodiments, and various modifications can be made by modifying variously within the scope of the present invention. For example, the oil groove 22b may be provided on the piston 30 side or on both the cylinder 20 side and the piston 30 side. As a cooling method of the fitting portion F1, in addition to circulation of the lubricating oil L, a cooling mechanism may be separately provided.

DESCRIPTION OF REFERENCE SYMBOLS 10, 10A gas cushion device
11 oil feeding mechanism
12 gas cushion mechanism
13 friction cushion mechanism
20, 20A cylinder
21 main body portion
21a lower side opening
21b side surface opening
22 inward flange portion
22a upper side opening
22b oil groove
22c annular groove
22d opening
22e protrusion
22f seal material retaining portion
22g first recess
22h first fitting surface
23 lid portion
23a injection valve
30, 30A piston
31 shaft portion
31a second recess
31b second fitting surface
32 piston main body portion
40 oil tank
41 upstream side check valve
42 downstream side check valve
43 cooler
50 press machine
51 die
51a die lower gouged portion
52 punch
53 pressing portion
54 gas cushion device by only a gas pressure
F1 fitting portion
F2 fitting portion between the first fitting surface and the second fitting surface
Fs cylinder side fitting portion
Fp piston side fitting portion
G gas
L lubricating oil
P space
S sealing chamber
W workpiece
L11 width of the first recess
L12 width of the first fitting surface
L13 sum of the width of the first recess and the width of the first fitting surface
L21 width of the second recess
L22 width of the second fitting surface L23 sum of the width of the second recess and the width of the second fitting surface
D1 depth of the first recess
D2 depth of the second recess

The invention claimed is:

1. A gas cushion device comprising:
a cylinder made from alloy steel;
a piston made from alloy steel, the piston being slidably fitted in the cylinder;
a gas enclosed in the cylinder to energize the piston; and
an oil feeding mechanism configured to feed a lubricating oil to a fitting portion between an inner circumferential surface of an inward flange portion of the cylinder and an outer peripheral surface of a shaft portion of the piston,
wherein the fitting portion is fitted in an interference fit state,
wherein the oil feeding mechanism has an opening provided in a side surface of a main body of the cylinder fitted with a piston main body portion, and an opening provided in the inward flange portion of the cylinder fitted with the shaft portion of the piston,
wherein the cylinder is provided with a plurality of first recesses arranged in a piston sliding direction at the fitting portion,
wherein the piston is provided with a plurality of second recesses arranged in the piston sliding direction at the fitting portion,
wherein the first recesses and the second recesses are oil grooves, and
wherein a first fitting surface is formed between the first recesses and a second fitting surface is formed between the second recesses.

2. The gas cushion device as recited in claim 1, wherein the shaft portion of the piston is tapered and reduced in diameter from inside of the cylinder toward outside of the cylinder.

3. The gas cushion device as recited in claim 1, wherein a frictional force due to interference fit is smaller than a repulsive force by the gas.

4. The gas cushion device as recited in claim 1,
wherein the oil feeding mechanism comprises a space formed between a lower surface of the inward flange portion of the cylinder and an upper surface of the piston main body portion so that a volume of the space is increased when the piston is depressed and the volume of the space is decreased when the piston is pulled out, and the space constitutes a pump that takes in the lubricating oil into the fitting portion from the opening provided in a side surface of a main body of the cylinder when the piston is depressed and discharges the lubricating oil taken into the fitting portion from the opening provided in the inward flange portion of the cylinder when the piston is pulled out.

5. The gas cushion device as recited in claim 1, further comprising a plurality of first fitting surfaces including the first fitting surface, and a plurality of second fitting surface including the second fitting surface, each first fitting surface being formed between respective two of the first recesses and each second fitting surface being formed between respective two of the second recesses,
wherein the plurality of first recesses is equal to each other in width in the piston sliding direction,
wherein the plurality of second recesses is equal to each other in width in the piston sliding direction,
wherein the plurality of first fitting surfaces is equal to each other in width in the piston sliding direction,
wherein the plurality of second fitting surfaces is equal to each other in width in the piston sliding direction,
wherein a width of each first fitting surface is equal to a width of each second fitting surface, and
wherein either one of a width of each first recess and a width of each second recess is equal to the width of each first fitting surface, and another is a multiple of 2 of the width of each first fitting surface.

6. The gas cushion device as recited in claim 1, further comprising a plurality of first fitting surfaces including the first fitting surface, and a plurality of second fitting surface including the second fitting surface, each first fitting surface being formed between respective two of the first recesses and each second fitting surface being formed between respective two of the second recesses,
wherein the plurality of first recesses is equal to each other in width in the piston sliding direction,
wherein the plurality of second recesses is equal to each other in width in the piston sliding direction,
wherein the plurality of first fitting surfaces is equal to each other in width in the piston sliding direction,
wherein the plurality of second fitting surfaces is equal to each other in width in the piston sliding direction, and
wherein a sum of a width of one first recess and a width of one first fitting surface is equal to a sum of a width of one second recess and a width of one second fitting surface.

7. The gas cushion device as recited in claim 6,
wherein the width of each first recess is equal to the width of each second recess, and
wherein the width of each first recess is greater than the width of each first fitting surface.

8. The gas cushion device as recited in claim 6,
wherein the width of each first recess is equal to the width of each second recess, and
wherein the width of each first recess is equal to the width of each first fitting surface.

9. A gas cushion device comprising:
a cylinder;
a piston slidably fitted in the cylinder;
a gas enclosed in the cylinder to energize the piston; and
an oil feeding mechanism configured to feed a lubricating oil to a fitting portion between the cylinder and the piston,
wherein the cylinder and the piston are fitted in an interference fit state,
wherein the cylinder is provided with a plurality of first recesses arranged in a piston sliding direction at the fitting portion,
wherein the piston is provided with a plurality of second recesses arranged in the piston sliding direction at the fitting portion, and
wherein a first fitting surface is formed between the first recesses and a second fitting surface is formed between the second recesses,
the gas cushion device further comprises a plurality of first fitting surfaces including the first fitting surface, and a plurality of second fitting surface including the second fitting surface, each first fitting surface being formed between respective two of the first recesses and each second fitting surface being formed between respective two of the second recesses,
wherein the plurality of first recesses is equal to each other in width in the piston sliding direction,
wherein the plurality of second recesses is equal to each other in width in the piston sliding direction, wherein the plurality of first fitting surfaces is equal to each other in width in the piston sliding direction, wherein the plurality of second fitting surfaces is equal to each other in width in the piston sliding direction, wherein a width of each first fitting surface is equal to a width of each second fitting surface, and wherein either one of a width of each first recess and a width of each second recess is equal to the width of each first fitting surface, and the other is a multiple of 2 of the width of each first fitting surface.

10. The gas cushion device as recited in claim 1, wherein the opening provided in the side surface of the main body of the cylinder is connected to the opening provided in the inward flange portion of the cylinder via a path with a cooler.

* * * * *